United States Patent [19]

Raabe et al.

[11] 4,073,673
[45] Feb. 14, 1978

[54] PROCESS FOR PRODUCING AN EXPANSION JOINT COVER

[75] Inventors: Paul J. Raabe, Oak Brook, Ill.; Harlan E. Tarbell, Torrance, Calif.

[73] Assignee: Grefco, Inc., Bala Cynwyd, Pa.

[21] Appl. No.: 643,807

[22] Filed: Dec. 23, 1975

Related U.S. Application Data

[63] Continuation-in-part of Ser. No. 431,766, Jan. 8, 1974, which is a continuation of Ser. No. 346,112, March 29, 1973, which is a continuation-in-part of Ser. No. 113,835, Feb. 9, 1971, abandoned.

[51] Int. Cl.² .............................................. B29F 3/10
[52] U.S. Cl. .................... 156/244; 264/171; 264/174; 264/177 R; 156/214
[58] Field of Search ............ 264/174, 171, 177 R; 156/214, 226, 244

[56] References Cited

U.S. PATENT DOCUMENTS

| | | | |
|---|---|---|---|
| 1,994,396 | 3/1935 | Kilner | 264/174 |
| 3,067,455 | 12/1962 | Reid | 264/171 |
| 3,780,152 | 12/1973 | Friesner | 264/174 |

Primary Examiner—Robert F. White
Assistant Examiner—James R. Hall
Attorney, Agent, or Firm—Everett H. Murray, Jr.

[57] ABSTRACT

A process for producing an expansion joint cover is provided for structures which comprises a substantially planar strip of flexible material with an insulating material affixed thereto, wherein the flexible planar strip has lateral portions extending beyond the insulating material with a means therein to retain mechanically a rigid reinforcing member to fixed elements of the building structure.

2 Claims, 1 Drawing Figure

PROCESS FOR PRODUCING AN EXPANSION JOINT COVER

BACKGROUND OF THE INVENTION

This application provides a process to produce an improvement over the expansion joint cover of Ser. No. 346,112, filed Mar. 29, 1973, which is a continuation of Ser. No. 113,835, filed Feb. 9, 1971, now abandoned, and is a continuation in part of Ser. No. 431,766, filed Jan. 8, 1974, now abandoned.

This invention relates to a process to produce a structural expansion joint cover which permits the free movement of building components while preventing the penetration of water, the effect of weather, and thermal loss and more specifically to a process of producing this expansion joint. Additionally, the expansion joint cover of the instant invention provides a continuous cover throughout the entire structure, for example, walls, floors, roofs or various attached decks or malls, and is flexible hinge in all dimensions. It conforms to unusual building designs, such as hyperbolic paraboloids, domes and other free-form architecture. Under conditions of building movement, the particular expansion joint of this invention is resistant to assuming a permanent set and will return to its original posture as the building components return to theirs. During these constant conformational changes, no fractures or fissures occur such as those normally experienced in metal expansion joint covers.

The fundamental article made by the process of this invention, as more fully described herein and providing all of the above noted advantages, consists basically of a planar strip of a flexible material which may be smooth, corrugated or the like and has attached to its bottom surface a planar portion of a relatively non-rigid compressible material possessing thermal insulating properties, wherein the planar strip of flexible material has hinged to and extending from its outermost lateral edges flexible areas of material which preferably contain a means of reinforcing and/or fastening to the roof with nails the expension joint cover, for example, a rigid body such as a metallic strip, which may be perforated to facilitate fastening and retention of the metallic in the flexible plastic.

Although the expansion joint cover referred to in the above noted prior application provided a major improvement over the prior art, it still suffered from one significant disadvantage. Namely, the original material was extremely hard to unroll and apply in cold weather. Since roofers frequently work below 40° F, an expansion joint cover must be utilizable at that temperature and frequently below it.

The process of the instant invention provides an expansion joint cover which can be readily and easily handled and applied at temperatures down to 0° F and with a minimum of difficulty down to −20° F.

An additional disadvantage of the expansion joint cover referred to above is that it often retains a wavy configuration after being unrolled, thereby increasing the difficulty encountered in its application. The expansion joint cover provided by the process of this invention unrolls easily and is practically wave-free.

The process of producing the expansion joint cover of this invention includes the step of extruding in a single continuous piece a planar strip of highly flexible material, having hinged and extended from each side an integral less flexible coplanar portion.

Simultaneously with the extrusion step, a thin planar metal reinforcing strip is enclosed within the coplanar portion of the joint cover.

Following the extrusion and enclosing steps a compressible insulating material of lesser width than the flexible planar strip is aligned to and then affixed to the flexible planar strip. The lesser width of the insulating material leaves a portion, at each side, of the flexible planar material, unaffixed to the insulating material whereby highly flexible hinge joints for bending are provided between the planar strip and the coplanar side portions.

OBJECTS OF THE INVENTION

It is a principal object of the process of this invention to provide an improved structural expansion joint cover which does not hinder the free movement of structural components but effectively prevents penetration and adverse effects of water, weather and thermal loss.

Another object of the process of this invention is to provide an improved structural expansion joint cover which forms an elastic and water resistant cover for expansion joints connecting structures, e.g. made of steel, concrete, wood or other structural building materials.

An additional object of this invention is to provide a process for making a structural expansion joint cover which conforms easily to architectural contours and can be used alone or in combination with other suitable expansion joint covers.

It is an additional object of this invention to provide a process for the integral extrusion of the backing member used in the expansion joint cover of the instant invention.

It is yet another object of the instant invention to provide a process to continuously extrude, by means of a cross head extruder, having a rigid reinforcing and/or fastening member within extended lateral coplanar portions of the extruded flexible backing member.

It is a further object to provide a process for producing an expansion joint cover which utilizes a flexible steel reinforcement wherein the steel is completely encased in plastic and is thereby rendered weather resistant.

It is an additional object of this invention to provide a process for increasing the retention of a flexible steel strip encased within an expansion joint cover by causing plastic material to flow into openings provided in the steel strip.

Further objects will become apparent from the following disclosure and claims:

Various types of structural expansion joint covers are exemplified by the prior art. All metal structural expansion joint covers can be fabricated from blueprints and made to order. These particular types of expansion joint covers do not have a flexible midsection by rely upon a "V" crimp to allow for movement across the void above the expansion joint and below the expansion joint cover. Metal slip joints or covers are used to provide for longitudinal movement and most rely upon flashing a counterflashing, or solder closure techniques to deter the elements. Insulation may be placed in the structural void to prevent condensation and provide thermal insulation. This type of cover is obviously quite expensive, difficult to use and, unless used in conjunction with insulation and separate and apart therefrom, does not provide adequate protection from the elements or thermal insulation.

Various types of plastic expansion joint covers are available which can be assembled either in the field or the factory. Various elastic substances are utilized in flexible form and adhered to the adjacent structural members by use of various types of adhesive, for example, asphalt, pitch or other conventional adhesives. These particular expansion joint covers may utilize a rigid foam to maintain an appropriate configuration and to provide thermal insulation. These too, suffer from various disadvantages including unacceptable configuration, difficulty in fastening the expansion joint covers to the adjacent structures and inconvenience in preparation and use in the field.

The expansion joint cover produced by the process described herein is designed to provide a flexible backing member having a planar strip and laterally extensive therefrom coplanar portions forming flexible flanges containing therein a rigid reinforcement, e.g. a metal strip, which aids in the rigidification of the expansion joint cover and provides a basis for attachment to the adjacent structures. All of the backing member components of the expansion joint cover of the instant invention namely, planar strip, and coplanar lateral portions, and reinforcement are extruded simultaneously through a die in an extruder of well known design to eliminate the necessity for chemically or mechanically bonding the various portions thereof. This process results in a fundamental unitary structure having widely different flexure characteristics, i.e. a hinging action, between the center and the side flange portions which is easy to use, durable and resistant to failure in the field. The rigid reinforcing member retained in the flexible lateral portions of the expansion joint cover provides a tear-proof means of attachment to a roof and since it is substantially completely contained in the flexible material without any seams and is not fastened by rivets, is virtually impervious to corrosive degradation.

SUMMARY OF THE INVENTION

The expansion joint cover made by the process disclosed herein is produced from all flexible plastic material, except for certain areas of reinforcement, and can therefore be unrolled and applied easily at temperatures down to 0° F and with moderate ease down to temperatures of −20° F.

An expansion joint cover is provided for structures which comprises a substantially planar strip of flexible material with insulating means affixed thereto, wherein the flexible planar strip has flexible lateral portions extending beyond the insulating means, and wherein each of the lateral extensions has a means therein to retain a rigid member which, inter alia, provides a means of support and attachment.

The rigid reinforcing member is contained in a channel within the flexible lateral portion of the substantially planar flexible backing member and the channel completely encloses the rigid reinforcing strip so that the latter is entirely surrounded by the flexible lateral portions. The rigidity of the reinforcing member must not be such that the entire expansion joint cover is rendered inflexible, preventing it from conforming to various architectural contours or rolled up for storage and shipment. The rigidity is relative, i.e. the remaining portions of the expansion joint are more flexible than the rigid reinforcing member.

The flexible lateral portions may have areas of varying thickness, i.e. increasing or decreasing thickness to provide a sufficiently thick section of the flexible material to effectively contain the reinforcing member.

The reinforcing member may be any sufficiently stiff material to provide support and should be capable of being extruded with the flexible material. Generally, this will be a metallic strip, such as steel, this being the preferred embodiment of this invention.

The reinforcement used in the flexible plastic material constitutes a further improvement in that flexible steel is used having a sufficient amount of spring such that it will not take a permanent shape when rolled to a diameter of 5 inches. Therefore, when the tension on a rolled-up strip expansion joint cover of the instant invention is released, it will unroll forming straight material free from waves or kinks. However, if the steel is sharply bent to an extreme angle such as 30° or greater, it will retain that shape and therby allow the formation of permanent shapes, either at the manufacturers or in the field. Furthermore, the reinforcing steel strips are relatively thin and are generally from about 0.008 inch to about 0.035 inch in thickness and from about 0.5 inch to about 4.0 inches in width.

Since an expansion joint cover is usually nailed into place through the flexible steel reinforcement, it must therefore allow a roofing nail to penetrate it. Holes may be punched into the steel strip to facilitate attachment or to assist in retaining the steel in the flexible plastic material. The plastic fills the perforations from both sides of the reinforcing strip and fuses at the junction.

The fundamental requirement for the flexible material is that it be formable from an extrudable polymer such as polyvinyl chloride, polyethylene, polypropylene, polyurethane, polyamide, polychloroprene, polybutadiene, polycarbonate, polystyrene, polyacrylonitrile, polyacrylate, and copolymers thereof. Additionally, this flexible plastic material must be flexible to temperatures of about −40° F and serviceable up to about 200° F. It must also be able to withstand exposure to elements of weather for minimum periods of from about 5 to about 30 years. Further, it must withstand the flexing encountered in a particular application.

Similarly, the relatively compressible insulating material may be any partially compressible insulating material which can be attached to the planar strip of flexible material but preferably is a layer of polymeric foam, and most preferably, is a closed cell durable foam which can be applied to the integral extrusion which comprises the backing member. The partically compressible insulating material preferably exhibits a K factor of 0.045 or lower. The coefficient of thermal conductivity, the K factor, is in units of $Btu\text{-}in/ft^2\text{-}hr\text{-}°f$ determined at a nominal mean temperature of 75° F and is a measure of the ability of the insulating composition to retard transference of heat, thereby providing good thermal insulation. The K factor, therefore, is generally a measure of thermal insulation efficiency in the insulating compositions. Its importance as an indicator of the insulating quality of insulating materials is well known in the industry. A reduction of as little as 0.01 or 0.02 units in a K fastor is often considered to be of substantial value as far as the utility of the end product is concerned. Generally, any polymer which can be formed as a flexible foam and attached to the backing member is suitable, such as the polymers, including copolymers, of ethylene, propylene, chloroprene, vinyl chloride and the vinyl compounds, urethanes, amides, butadienes, acrylonitriles, acrylates, and rubbers, both natural and synthetic, among others.

The preferred embodiment of the foregoing expansion joint cover comprises a substantially planar strip of flexible material with lateral coplanar extensions wherein each can be a different thickness of the same polymer or different formulations of the same material or different materials which can be simultaneously extruded. For example, a planar strip of compressible polyvinyl chloride foam can be attached to the flexible planar strip of polyvinyl chloride and the coplanar portion can be thicker polyvinyl chloride extrudate containing a reinforcing member which is in the form of a metallic strip completely contained in the lateral coplanar portions and simultaneously extruded therewith prior to the attachment of the polyvinyl chloride insulating foam.

In the drawing

FIG. 1 represents a preferred embodiment of the product process of the instant invention and is used in an exemplary way for the purpose of illustration and the invention is not limited to each and every aspect thereof unless so provided in the appended claims.

Figure 1:
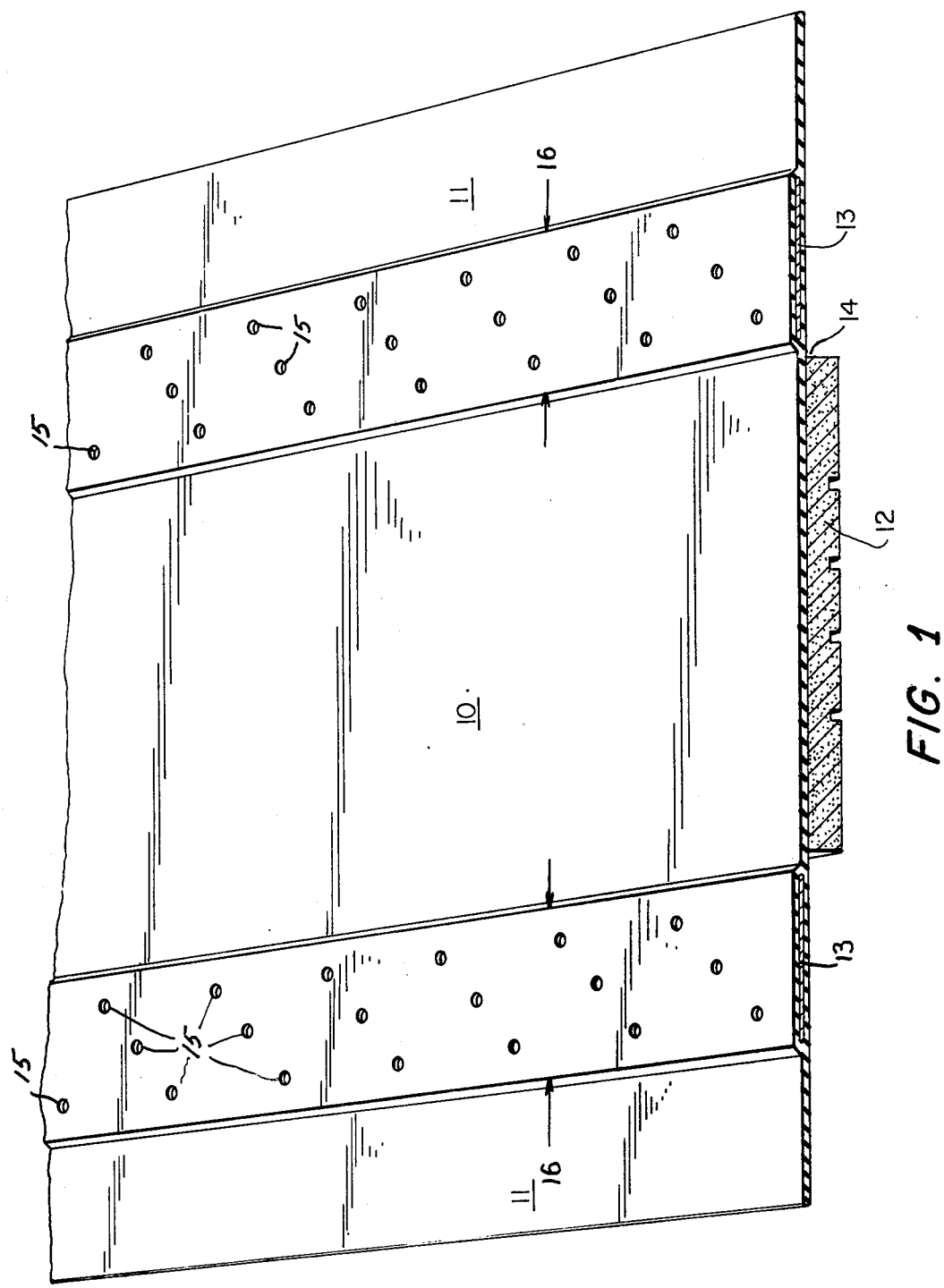
FIG. 1 represents a plan view of the expansion joint cover of the instant invention with one end shown in the cross-section.
Figure 2:
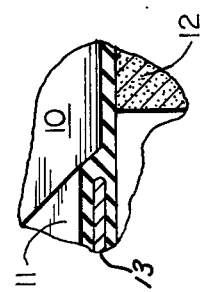
FIG. 2 shows an enlargement, partly in section, of the soft, flexible hinge portion in the embodiment of FIG. 1.

The expansion joint cover in FIG. 1 includes a substantially planar strip of extrudable flexible material 10 having attached thereto or integral therewith and extending therefrom lateral portions 11 of any suitable width of a material which is easily extrudable, preferably formed from a polymer such as polyvinyl chloride, but also, for instance, may be made from other suitable polymers, including copolymers, such as polyethylenes, polypropylenes, polyurethanes, polyamides, polychloroprenes, polybutadienes, polyacrylonitriles or polyacrylates. As shown in FIG. 1 the planar strip 10 is smooth, although in an alternative embodiment the planar strip may contain slight ridges (not shown) which are equally satisfactory. The insulating material 12 has a K factor of .045 or better and is in the form of a substantially planar strip, generally thicker than the flexible planar strip 10 to which it is attached and is relatively compressible. Any suitable material fulfilling these requirements can be used. However, for convenience in manufacture and durability in use, a foamable polymer is preferred such as foamed polyvinyl chloride. Other foamable polymers are utilizable as an insulating material, such as polybutadienes, polychloroprenes, polyurethanes, polyamides, or any suitable copolymers thereof.

In addition to providing the insulation, the foamed polymeric material assists the expansion joint cover in maintaining a standard reproduceable form while the structural members are affected by temperature differences. Polyvinyl chloride foam is preferred since it produces a closed cell durable foam which is amenable to in-line application, subsequent to the simultaneous extrusion of the expansion joint backing member. Depending on the materials used, the insulating material 12 may be attached to the flexible planar strip 10 by any suitable means such as contact adhesive, heat fusion, mechanical fastening or solvent welding.

The rigid reinforcing members 13 may be completely contained in the lateral portions 11 of the expansion joint backing member, as shown in the drawing, or may be partially contained therein or attached thereto. Generally, the rigid reinforcing member 13 is a steel strip, perforated or unperforated, completely contained in the lateral portions 11 and simultaneously extruded with the flexible planar strip 10 and the lateral portions 11 of the backing member. Although the section 16 containing the reinforcing member 13, is shown in the drawing as being of somewhat greater thickness than the remaining width of the lateral portions 11, this does not necessarily have to be the case. The lateral portions 11 may also be of a uniform thickness having the reinforcing member 13 contained therein and extruded simultaneously therewith.

The width of insulating material 12 is slightly narrower than that of planar strip 10, so that planar strip 10 at its edges slightly overhangs the insulating material strip 12. This provides a region in planar strip 10 between insulating material 12 and lateral portion 11 and reinforcing member 13, identified as hinge region 14, which allows a hinging action there between. This hinged region 14 will increase the east of installation and assist the structural expansion joint in maintaining a uniform conformation after insulation.

The rigid reinforcing member 13 and lateral portion 11 may be perforated as indicated by holes 15 to indicate uniform spacing wherein the expansion joint cover may be attached to various structural materials, for example, metal, wood or concrete, by nails, rivets or other similar mechanical forms of attachment. Alternatively, in order to improve retention within the lateral portion 11, only the reinforcement member 13 may be perforated. In the latter case the location of the perforations would be indicated by a slight surface deformation on the surrounding lateral portions 11 or by the greater flexibility of the area above a perforation. Additionally, expansion joint covers may be secured in concrete during pour, secured by solvent welding, by contact adhesive or by other suitable means. Similarly, various sections along similar or dissimilar contours of structures may be attached to each other mechanically as by riveting or nailing or secured in concrete during pour, by contact adhesive or by solvent welding.

The production of the expansion joint cover of the instant invention involves the use of three basic materials: (1) a flexible material to form the planar strip 10 and lateral portions 11, for example, a thick polyvinyl chloride film or sheet; (2) a rigid reinforcing member 13 such as steel which may be perforated or unperforated; and (3) an insulating material 12 such as, for example, closed cell polyvinyl chloride foam. Other polymers, including copolymers, may be substituted as required for the particular formation or manufacture of the expansion joint cover, as discussed hereinbefore.

All components, except for the insulating material 12, are simultaneously extruded through a die in a continuous strip. The insulating material 12 may be applied in an in-line process immediately subsequent to the extrusion. The extruded product consists of a flexible midsection, namely, the planar strip 10 having a lateral coextension of flexible material on each side wherein each of the lateral portions 11 will have contained therein a continuous rigid reinforcing member 13, for example, a metal strip, placed therein through the use of an extruder. The insulating material 12 can be applied to the flexible planar strip 10 for the purpose of insulating against condensation and maintenance of an upright conformation in the field. The lateral portions 11 can be manufactured both flat and perforated, as aforesaid, and in alternative embodiments with one or both flanges bent at various angles and corrugated.

The principles, preferred embodiments and modes of operation of the present invention have been described in the foregoing specification. The invention which is intended to be protected herein, however, is not to be construed as limited to the production of particular forms disclosed since these are to be regarded as illustrative rather than restrictive. Variations and changes may be made by those skilled in the art without departure from the spirit of the present invention.

What is claimed:

1. A process for producing a flexible, weather resistant, hinged expansion joint cover including a flexible strip and flexible hinged lateral portions having lock-in reinforcing members, and insulating material adjacent said planar strip, said flexible strip and portions being fabricated of extrudable material, said extrudable material being a resinous polymer extrudable when in a flowable state, and selected from the group consisting of polymers of polyethylenes, polypropylenes, polyurethanes, polyamides, polychloroprenes, polybutadienes, polyacrylonitriles, polyvinyl chlorides or polyacrylates, wherein said resinous polymer remains flexible and penetrable by a nail within the range of from about $-50°$ about $+200°$ F, and withstands prolonged direct exposure to outdoor weathering;

said reinforcing member comprised of a strip of relatively thin planar spring material, said strip being perforated and having a rigidity substantially greater than that of said lateral portions and a thickness less than that of said lateral portions, said reinforcing member if coiled about a 5" diameter mandrel and released, being elastic so as to return to its original shape;

said insulating material being planar and compressible, said insulating material being a polymeric foam selected from the group consisting of foamed polymers and copolymers of ethylene, propylene, choroprene, vinyl halides, urethanes, amides, butadienes, acrylonitriles, acrylates and natural and synthetic rubbers wherein said polymeric foam has a K factor of from about 0.012 to about 0.045 Btu-in/ft$^2$-hr-=F;

comprising the steps of:

(a) simultaneously extruding said substantially flexible planar strip of said extrudable material, with said lateral portions extended one from each side of said planar strip in the same plane as said planar strip;

(b) simultaneously placing and completely enclosing during said extrusion one of said reinforcing members in each of said lateral portions;

(c) aligning a strip of said planar insulating material adjacent said planar strip subsequent to said extrusion step and confining said insulating material slightly within the edges of said planar strip, and (d) fastening said strip of said insulating material in said aligned position to said planar strip to form a flexible hinge between said planar strip and said lateral portions and produce said flexible hinged expansion joint cover.

2. The process of claim 1 wherein said planar strip of flexible material and said less flexible lateral portions comprise a polyvinyl chloride material and said insulating material is polyvinyl chloride foam affixed to said substantially planar strip and said reinforcing member is spring steel having a thickness of from about 0.008 inch to about 0.035 inch and a width of from about 0.05 inch to about 4.0 inches.

* * * * *